United States Patent [19]
Nelson

[11] 3,786,888
[45] Jan. 22, 1974

[54] TORQUE COMPENSATED WALKING BEAM

[75] Inventor: Stanley Oscar Nelson, Sunnyvale, Calif.

[73] Assignee: Lockheed Missiles & Space Company, Inc., Sunnyvale, Calif.

[22] Filed: May 22, 1972

[21] Appl. No.: 255,824

[52] U.S. Cl. .......................... 180/24.11, 180/24.05
[51] Int. Cl. ............................................. B62d 61/10
[58] Field of Search 180/24.02, 24.05, 24.11, 24.13, 180/24.01, 43 B

[56] References Cited
UNITED STATES PATENTS

| | | | |
|---|---|---|---|
| 2,824,615 | 2/1958 | Lado | 180/24.05 |
| 2,825,415 | 3/1958 | Boughner et al. | 180/24.11 |
| 3,299,978 | 1/1967 | Sponsler | 180/24.05 |
| 3,400,199 | 5/1946 | Harbers | 180/24.13 |
| 2,260,468 | 11/1941 | Lewis | 180/24.13 |
| 3,349,863 | 10/1967 | Wagner | 180/24.01 |

FOREIGN PATENTS OR APPLICATIONS

| | | | |
|---|---|---|---|
| 939,079 | 10/1963 | Great Britain | 180/43 B |
| 1,100,405 | 6/1955 | France | 180/24.02 |

*Primary Examiner*—Kenneth H. Betts
*Assistant Examiner*—Ross Weaver

[57] ABSTRACT

A vehicular walking beam suspension system which provides equal ground pressure on the ground under dynamic conditions is shown. Gear reduction is provided at each wheel hub and the ensuing torque reaction is fed directly back to the vehicle chassis.

4 Claims, 4 Drawing Figures

TORQUE COMPENSATED WALKING BEAM

BACKGROUND OF THE INVENTION

In the past, vehicles, particularly those which were designed for carrying heavy loads over rough terrain have used walking beams with tandem power driven wheels mounted on trailing arms. The trend is towards larger vehicles with larger material handling and carrying capability. Larger tires must be used on these larger vehicles to maintain acceptable, light ground pressures. These larger tires which have more rolling friction, require larger applications of power. The conventional one-to-one chain drive requires large, strong chains going around large diameter sprockets to transmit this power, which in turn creates weight and strength problems.

One way to overcome these problems is to provide a gear reduction at the hub of the drive wheels. This allows the use of smaller, higher-speed drive axles, sprockets and chains. U. S. Pat. No. 3,450,221 (issued June 17, 1969) shows the use of a gear reduction at the hub. This type of gear reduction is useful when the vehicle must be capable of climbing steep surfaces. However, the use of a gear reduction at the hub has not been extensively used on other walking beam vehicles because the torque reaction in the walking beam tends to rotate the walking beam, causing unequal ground pressures to be applied by the two tires mounted on the walking beam. To overcome this problem, applicant cancels out the torque reaction caused by the gear reduction by feeding it directly back to the vehicle chassis; thus, lighter, higher speed drives, sprockets and chains can be used without causing uneven ground pressure loading, usually associated with this type of drive.

SUMMARY OF THE INVENTION

Further objects, features and advantages of the invention pertaining to the particular arrangement and structure whereby the above mentioned aspects of the invention are obtained will be ready understood by reference to the following description and drawings wherein.

Figure 1:
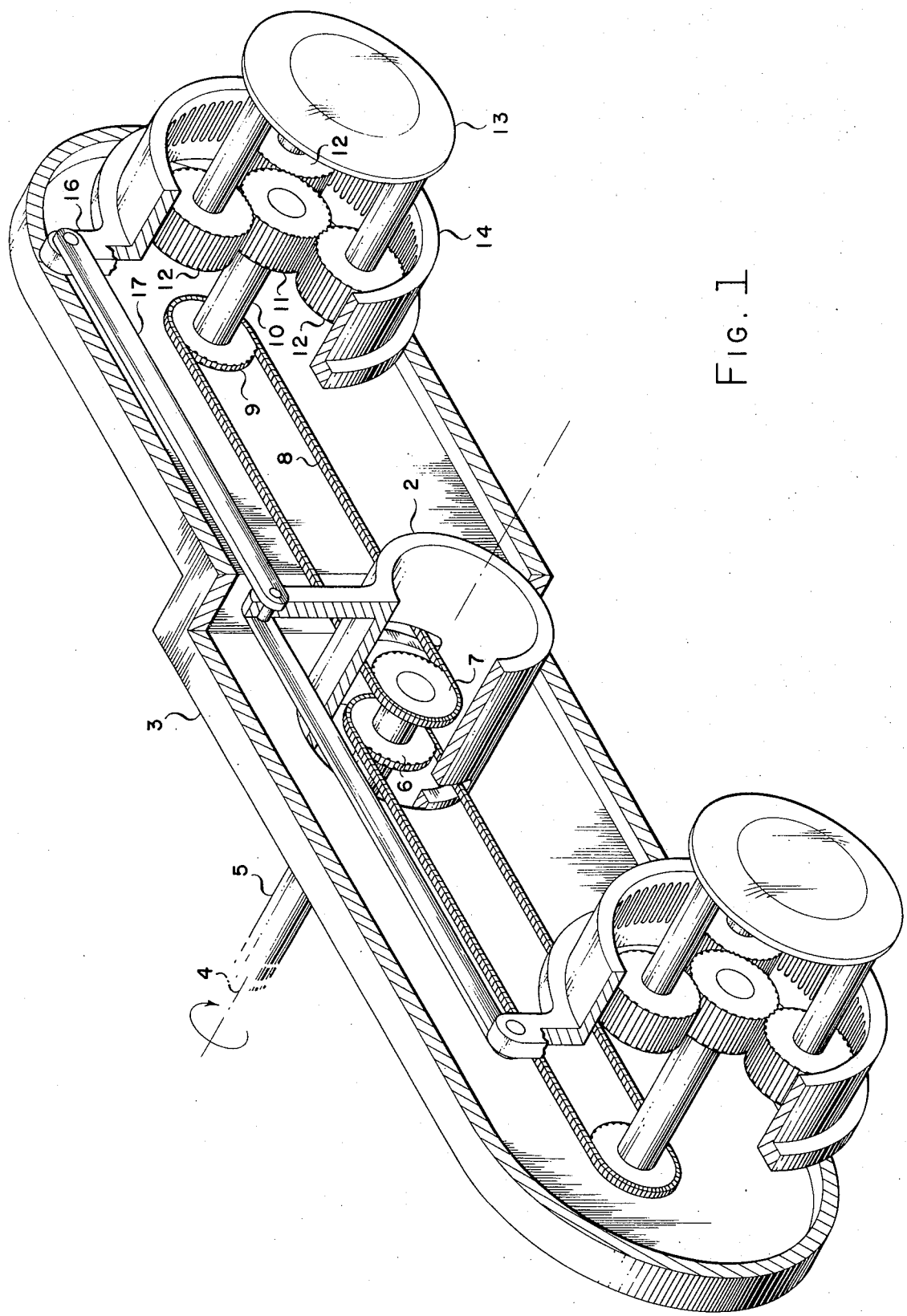
FIG. 1 is a fragmentary schematic view of a walking beam embodying the invention.
Figure 2A:
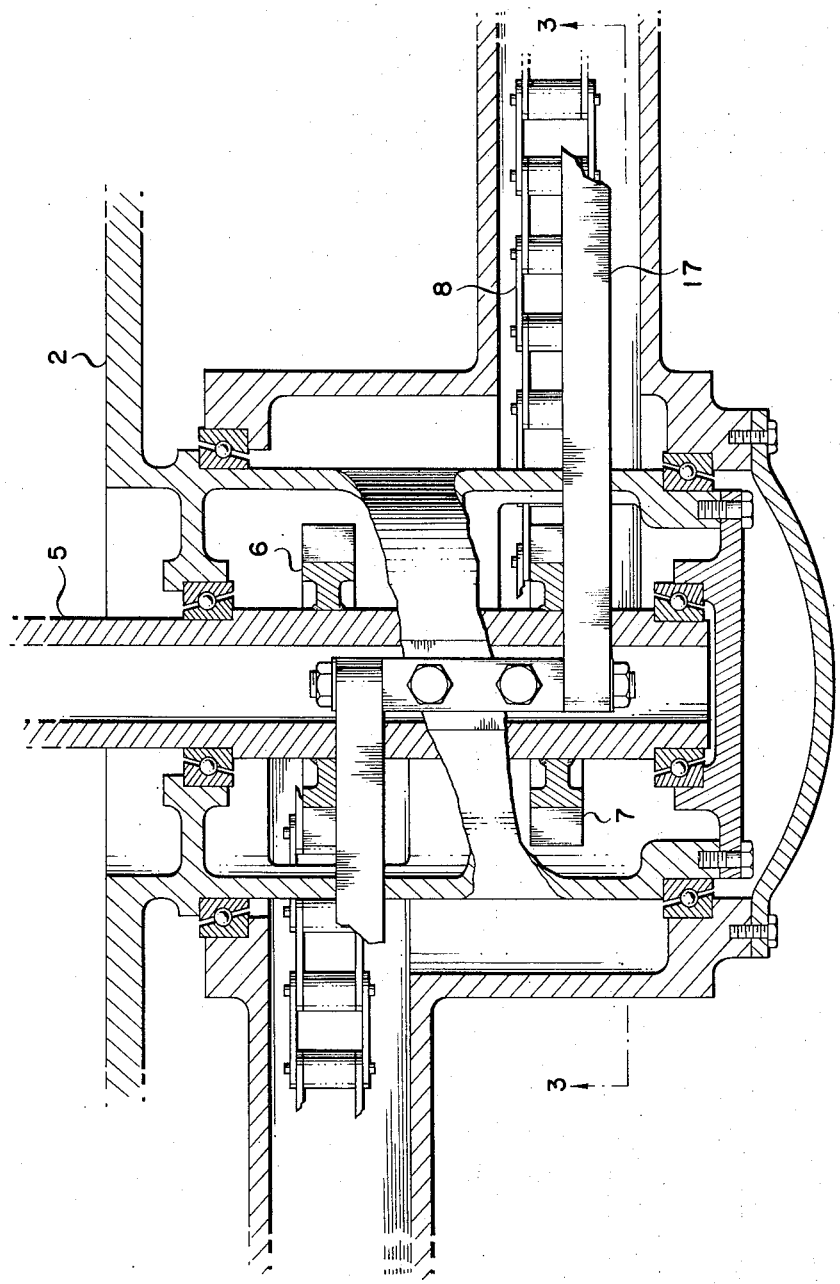
FIGS. 2A and 2B are cross-sectional fragmentary views of the walking beam housing and other portions of the drive mechanism illustrated schematically in FIG. 1.
Figure 2B:
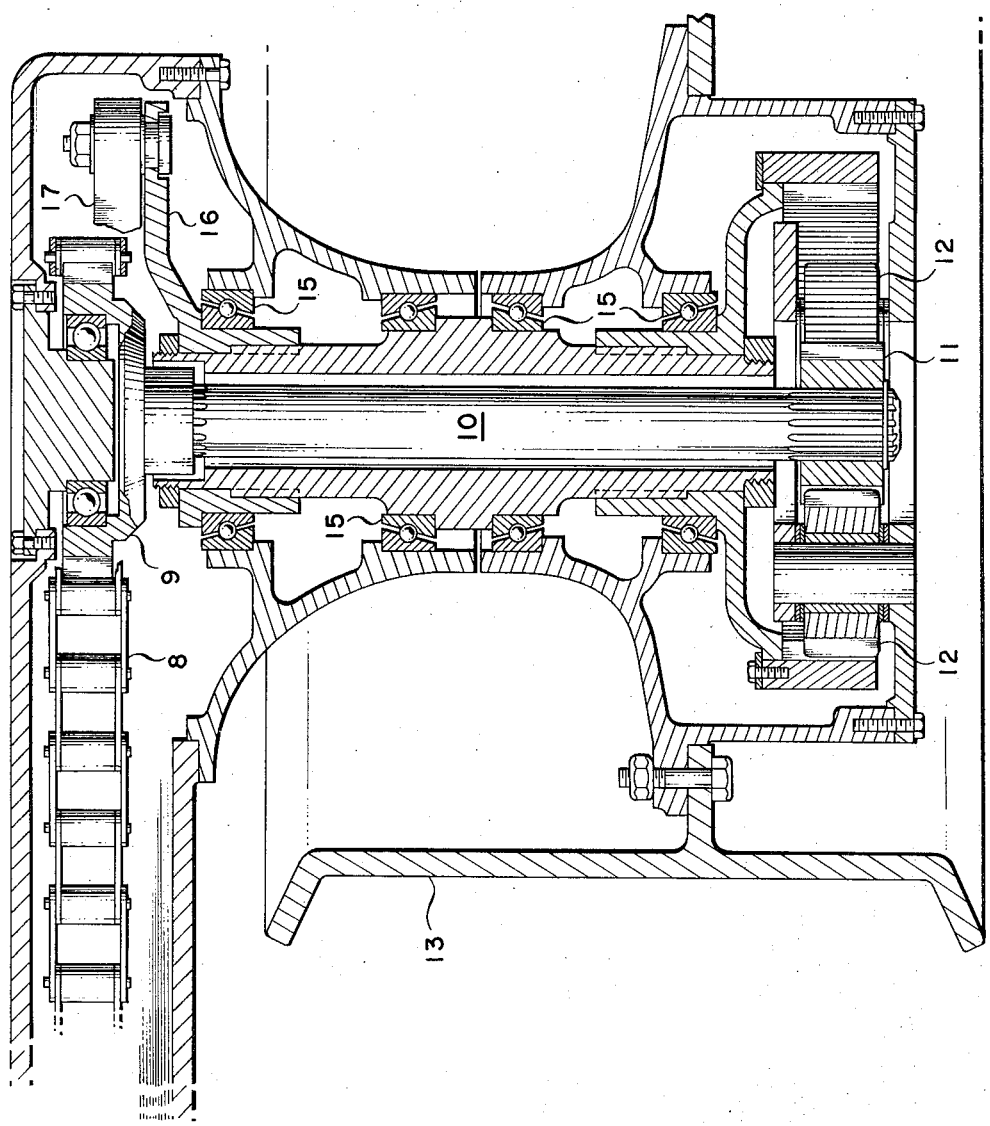
Figure 3:
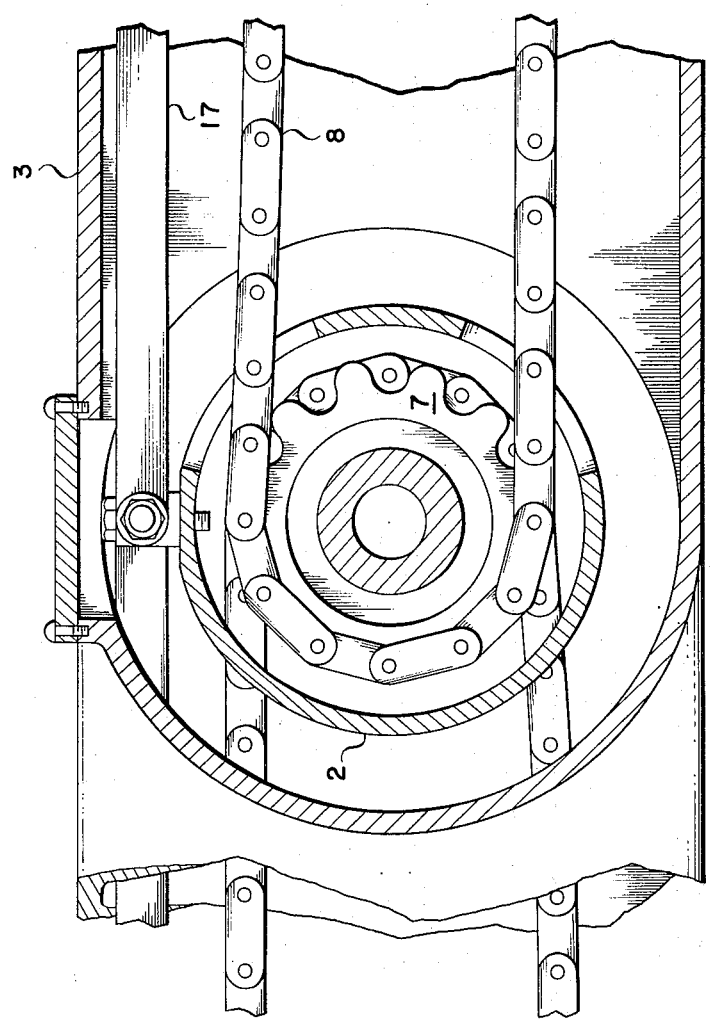
FIG. 3 is a vertical section view taken along line 3—3 of FIG. 2A and showing typical co-axial chain sprockets, drive shaft and body portion of the material handling machine.

Referring to the drawings in detail, there is shown an exemplary material handling machine incorporating the present invention. The machine comprises a body portion 2 which has a walking beam housing 3 suspension on the side shown and will, of course, have a similar walking beam suspension on the opposite side. The description here relates of course essentially to the drive structure and walking beam. Those components and features not described in detail here may be of any suitable known construction. See, for example, U.S. Pat. No. 3,414,072 to W. Hodges, et al. (issued Dec. 3, 1968) which is herein incorporated by reference. The material handling structure may be the conventional fork lift, bucket loader, dozer or other earth moving tool.

It is seen that the walking beam housing 3 is pivotly mounted to the body portion 2 at axis 4. Co-axial with axis 4 is the power drive shaft 5. A pair of chain sprockets 6 and 7 are secured co-axially with the outboard portion of the power drive shaft to lie within the walking beam housing 3. A drive chain 8 transmits power from chain sprocket 7 to sprocket 9 which is mounted on jack shaft 10. Sun gear 11 is rigidly attached to the outboard portion of jackshaft 10. A plurality of planet gears 12 are in mesh with sun gear 11 and also in mesh with ring gear 14. A wheel hub mounting means 13 is pivotally mounted to the plurality of planet gears 12 by a plurality of roller bearings 15. Rigidly mounted to the ring gear 14 is reaction lever 16. Reaction link 17 connects reaction lever 16 directly to the chassis 2.

OPERATION

The operation of the illustrative form of the invention is as follows:

When an increase of power is supplied to power drive shaft 4 in a clockwise direction (see FIG. 1), chain gears 6 and 7 are driven in a clockwise direction. This turns both wheel hubs and the respective wheels (not shown) in a clockwise direction through the drive chain and the gear mechanism which in turn moves the vehicle to the right as shown in FIG. 1. This application of power tends to lift the leading wheel while increasing the downward pressure on the following wheel. This tendency is overcome by applying the torque directly to the body portion 2 through reaction lever 16, and reaction link 17. Obviously any sudden decrease in power would reverse all forces but these forces also would be cancelled by the reaction lever 16 and reaction link 17.

This invention provides a simple and effective torque compensated walking beam particularly suited for large vehicles carrying heavy loads over rough terrain wherein an otherwise conventional planetary gear reduction means is provided at each hub which includes a planetary gear system in which the ensuing torque is transmitted directly to chassis instead of to the walking beam.

It will be apparent to those skilled in the art that the means disclosed can be reversed or modified without departing from this invention. For example, the function and connection of the planetary gears and ring gear can be reversed.

What is claimed is:

1. A torque compensating walking beam system comprising:
   a vehicular chassis,
   a walking beam having first and second ends,
   said walking beam being pivotally mounted to said chassis at an axis intermediate said first and second ends,
   drive means connected to said chassis at said axis of said walking beam,
   attachment means at each of said first and second ends of said walking beam for attaching a ground engaging means to said walking beam,
   gear reduction means mounted at each of said attachment means,
   means connecting said drive means to said gear reduction means, means coupling said gear reduction means to the chassis for transmitting the torque reaction of the gear reduction means to said vehicular chassis instead of said walking beam.

2. The torque compensating walking beam of claim 1 wherein said gear reduction means comprises a planteary gear means including at least an intermeshed first gear means, second gear means and third gear means; said first gear means operably connected to said drive means by said connecting means, said third gear means drivingly attached to said attachment means, and said second gear means connected to the said chassis by said coupling means.

3. The torque compensating walking beam of claim 2 wherein said first gear means is a sun gear, said second gear means is a ring gear and said third gear means is a plurality of planet gears.

4. The torque compensating walking beam of claim 3 wherein said means connecting said sun gear to the chassis comprises a reaction lever and a reaction link.

* * * * *